UNITED STATES PATENT OFFICE.

LUDWIG SEISSER, OF MUNICH, GERMANY.

PROCESS OF TREATING COFFEE.

953,643. Specification of Letters Patent. Patented Mar. 29, 1910.

No Drawing. Application filed November 1, 1909. Serial No. 525,766.

*To all whom it may concern:*

Be it known that I, LUDWIG SEISSER, citizen of Germany, residing at Munich, Bavaria, Germany, have invented certain new and useful Improvements in Processes of Treating Coffee; and I do hereby declare the following to be a full, clear, and exact description of the invention, such as will enable others skilled in the art to which it appertains to make and use the same.

This invention relates to the treatment of coffee in such a way as to obtain uncomminuted coffee beans poor in caffein.

For many reasons it is desirable to obtain coffee beans somewhat less rich in caffein than the natural coffee, but otherwise having substantially the properties of such natural coffee. This involves some form of extraction with a solvent which will remove the caffein without affecting the other constituents of the coffee to any great extent, and this solvent must be one of the volatile solvents and not water, since water of course extracts the valuable soluble constituents which are desired for making a beverage from coffee. The extraction with such a volatile solvent, using whole coffee beans, is of course a tedious and difficult operation since diffusion must be relied upon to cause the contained solubles in the interior of the bean to penetrate to the solvent on the exterior, and diffusion is a slow process with caffein. In the prior art many efforts have been made to facilitate and quicken this extraction by various methods of loosening the structure of the bean in order to prepare the cellular tissue for a good penetration of solvent. This, however, is injurious to the quality of the coffee.

In the present invention, a cheap, simple and ready method is provided whereby a positive circulation of the body of solvent through a mass of coffee beans is obtained. It is practically impossible to produce such circulation by ordinary stirring means, since stirring members will bruise and injure the coffee beans. I therefore contact a relatively large body of a volatile solvent with a mass of coffee beans in a suitable apparatus and produce a rapid circulation of the mass of solvent to and through the body of coffee beans. This circulation is best effected in some sort of centrifugal device. Subsequent to the extraction, the large body of solvent may be removed and residual adhering solvent removed from the beans by centrifugal action.

The following example constitutes what I consider the best way of carrying out my invention and will serve to fully disclose the same. About 5 kilograms of uncomminuted raw coffee beans together with about 15 kilograms of acetic ether (ethyl acetate) are introduced into a centrifugal apparatus provided with a steam jacket and means for causing this body of solvent to circulate to, through and away from the mass of coffee beans in a continuous circuit. Such a centrifugal apparatus is shown and described, for example, in German Patent No. 125597. The temperature of this mixture is then raised to about 68° centigrade, by introducing steam into the jacket. This temperature is maintained during the entire period of extraction. The centrifugal apparatus is then started, whereby a continual circulation of the extracting medium or liquid through the body of coffee beans is effected. After having submitted the mixture to this centrifugal circulation and extracting action for a period of about three hours, the solvent is drawn off and a fresh charge of about 10 kilograms of acetic ether is added. The temperature of the new mixture is again raised to about 68° centigrade and it is again submitted to centrifugal action, this time for about two hours. The body of solvent is then again drawn off from the apparatus and thereupon the centrifugal action is continued for about from one to two hours, while continually introducing steam at a temperature below 100° centigrade into the apparatus, whereby the last traces of the solvent are driven out of the coffee. The products of condensation having been drawn off from the apparatus, the mass is again submitted to centrifugal action in the apparatus, the temperature being now reduced to between 40° to 45° centigrade, substantially. By this means the beans are dried. This drying operation being completed, the beans can be discharged from the apparatus. It is of advantage to put the centrifugal drum into communication with a reflex cooling apparatus. In this manner the vapors of acetic ether, which are formed, are condensed and returned to the drum of the centrifugal apparatus in liquid form.

By this process about 4% of the weight of the coffee in the form of extractive matter is removed, consisting mainly of caffein. These substances are dissolved in the acetic ether, which may be freed from them by well-known methods and obtained in a pure state. The residue forms a resinous mass which is solid at ordinary temperatures and which consists of a caffein, fats, gums and resinous matters. By tests applied to the resultant coffee beans it has been found that they contain only about one-tenth of one per cent. of the caffein originally existing in the raw coffee beans.

Instead of employing a steam jacket for the drum of the centrifugal apparatus, a hot water jacket may be employed and the temperature in the interior of the drum may be maintained at the required point by heating the solvent in a suitable heater before introducing it into the drum. This preheating of the acetic ether may also be employed together with the steam or hot water jacket. Moreover, the solvent may be removed from the beans by centrifugal action unaided by steam, or the latter dry centrifugal action and the centrifugal action combined with the introduction of steam into the drum may be employed in succession.

Under my present invention the caffein is extracted from the whole uncomminuted raw coffee beans and the said whole coffee beans can rest against the perforated sides of the centrifugal walls without changing position. They are neither stirred, agitated, nor otherwise disturbed, while the extracting liquid circulates past them. When the process is finished the individual coffee beans have, therefore, not been crushed, or changed in form or appearance, a point of the highest importance for the production of a marketable product. Other volatile solvents of caffein beside acetic ether, which leave the other constituents of the coffee bean substantially undisturbed, may be employed in carrying out my invention. For example, I will state that benzene or benzol will give good results since it leaves on evaporation of an extract from coffee beans made with it almost pure caffein. I find also that good results of this character are obtained when using carbon tetrachlorid, ethane tetrachlorid, benzene dichlorid, sulfuric ether or ethylene trichlorid.

What I claim as new and desire to secure by Letters Patent, is:—

1. The process of treating coffee, which consists in subjecting raw uncomminuted coffee beans to the action of a solvent of caffein, substantially such as described, and causing a centrifugal circulation of such solvent past such beans while maintaining the beans stationary with respect to each other.

2. The process of treating coffee, which consists in subjecting uncomminuted raw coffee beans to the action of a volatile solvent of caffein, substantially such as described, at a temperature of substantially 68° centigrade and causing a centrifugal circulation of the solvent past the beans while maintaining said temperature.

3. The process which consists in subjecting raw coffee beans to heat between substantially 39 degrees centigrade and the boiling point of water concurrently with the action of a volatile solvent substantially such as described while causing centrifugal circulation of such solvent past the raw coffee beans, and maintaining the temperature uniform throughout the process.

4. The process which consists in subjecting raw coffee beans to the action of a volatile solvent of caffein, substantially such as described, constantly maintained below the boiling point of water and above substantially 39 degrees centigrade and also maintained in constant circulation past such beans by centrifugal action, while maintaining the temperature below the boiling point of water.

5. The process which consists in subjecting raw coffee beans to the action of a volatile solvent of caffein, substantially such as described, while maintaining the temperature below the boiling point of water and above substantially 39 degrees, centigrade, and causing a centrifugal circulation of said solvent past the beans, then drawing off the solvent, introducing steam at a temperature somewhat below 100° centigrade, and again subjecting the beans to centrifugal action.

6. The process which consists in subjecting raw coffee beans to the action of a volatile solvent of caffein, substantially such as described, while maintaining the temperature below the boiling point of water and above substantially 39 degrees, centigrade, and causing a centrifugal circulation of said solvent past the beans, then drawing off the solvent, introducing steam at a temperature somewhat below 100° centigrade, again subjecting the beans to centrifugal action, and finally drawing off the products of condensation and again submitting the beans to centrifugal action at a temperature of substantially 40° centigrade.

7. The process of treating coffee, which consists in subjecting raw coffee beans to the action of acetic ether while maintaining a centrifugal circulation of said acetic ether past such raw beans, and then removing the acetic ether by centrifugal action.

In testimony whereof I hereunto affix my signature in the presence of two witnesses.

LUDWIG SEISSER.

Witnesses:
 LOUIS MUELLER,
 MATHILDE K. HELD.